(12) United States Patent
Tucker et al.

(10) Patent No.: US 11,283,084 B2
(45) Date of Patent: Mar. 22, 2022

(54) FABRICATION PROCESSES FOR SOLID STATE ELECTROCHEMICAL DEVICES

(71) Applicant: THE REGENTS OF THE UNIVERSITY OF CALIFORNIA, Oakland, CA (US)

(72) Inventors: Michael C. Tucker, Piedmont, CA (US); Emir Dogdibegovic, Oakland, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 328 days.

(21) Appl. No.: 15/968,917

(22) Filed: May 2, 2018

(65) Prior Publication Data

US 2018/0323443 A1 Nov. 8, 2018

Related U.S. Application Data

(60) Provisional application No. 62/500,738, filed on May 3, 2017.

(51) Int. Cl.
*H01M 4/00* (2006.01)
*H01M 4/88* (2006.01)
(Continued)

(52) U.S. Cl.
CPC ....... *H01M 4/8882* (2013.01); *H01M 4/8621* (2013.01); *H01M 4/8842* (2013.01);
(Continued)

(58) Field of Classification Search
CPC ............ H01M 4/8882; H01M 4/8842; H01M 4/8621; H01M 8/1007; H01M 4/8846;
(Continued)

(56) References Cited

U.S. PATENT DOCUMENTS

| | | | |
|---|---|---|---|
| 7,833,674 B2 | 11/2010 | Mukerjee et al. | |
| 8,802,316 B1 * | 8/2014 | Liu | H01M 8/1213 429/479 |

(Continued)

OTHER PUBLICATIONS

Burye et al., "Nano-ceria pre-infiltration improves La0.6Sr0.4Co0.8Fe0.2O3-x infiltrated Solid Oxide Fuel Cell cathode performance." Journal of Power Sources, vol. 300, pp. 402-412, Sep. 21, 2015.

(Continued)

*Primary Examiner* — Nicholas P D'Aniello
(74) *Attorney, Agent, or Firm* — Lowenstein Sandler LLP

(57) ABSTRACT

This disclosure provides systems, methods, and apparatus related to electrode structures. In one aspect, a method includes: providing an electrode layer comprising a ceramic, the ceramic being porous; providing a catalyst precursor, the catalyst precursor being a cathode catalyst precursor or an anode catalyst precursor; infiltrating the catalyst precursor in a first side of the electrode layer; after the infiltrating operation, heating the electrode layer to about 750° C. to 950° C., the catalyst precursor forming a catalyst, the catalyst being a cathode catalyst or an anode catalyst; infiltrating the catalyst precursor in the first side of the electrode layer; after the infiltrating operation, heating the electrode layer to about 300° C. to 700° C., the catalyst precursor forming the catalyst, the catalyst being the cathode catalyst or the anode catalyst.

21 Claims, 11 Drawing Sheets

(51) Int. Cl.
  *H01M 4/86* (2006.01)
  *H01M 8/1007* (2016.01)
  *H01M 8/12* (2016.01)

(52) U.S. Cl.
  CPC ....... *H01M 4/8846* (2013.01); *H01M 8/1007* (2016.02); *H01M 4/885* (2013.01); *H01M 4/8885* (2013.01); *H01M 2008/1293* (2013.01)

(58) Field of Classification Search
  CPC ......... H01M 2008/1293; H01M 4/885; H01M 4/8885
  See application file for complete search history.

(56) References Cited

U.S. PATENT DOCUMENTS

| | | | |
|---|---|---|---|
| 9,660,273 | B2 | 5/2017 | Bierschenk et al. |
| 9,666,891 | B2 | 5/2017 | Bierschenk et al. |
| 2008/0193803 | A1 | 8/2008 | Sholklapper et al. |
| 2009/0169942 | A1* | 7/2009 | Hertz ................ C23C 14/06 429/403 |
| 2011/0089028 | A1* | 4/2011 | Larsen ............... H01M 4/9025 204/252 |
| 2011/0251053 | A1 | 10/2011 | Tucker et al. |
| 2014/0287342 | A1 | 9/2014 | Jabbar et al. |
| 2015/0244001 | A1* | 8/2015 | Samson ............... H01M 4/885 429/528 |
| 2016/0020468 | A1 | 1/2016 | Gerdes et al. |
| 2016/0329576 | A1 | 11/2016 | Liu et al. |

OTHER PUBLICATIONS

Burye et al., "Precursor solution additives improve desiccated La0.6Sr0.4Co0.8Fe0.2O3-x infiltrated solid oxide fuel cell cathode performance." Journal of Power Sources, vol. 301, pp. 287-298, Oct. 6, 2015.
Tucker, et al., "Progress in metal-supported solid oxide fuel cells: A review." J. Power Sources, vol. 195, pp. 4570-4582 (2010).
Dayaghi, et al., "Stainless steel-supported solid oxide fuel cell with La0.2Sr0.8Ti0.9Ni0.1O3—δ/yttria-stabilized zirconia composite anode". J. Power Sources, vol. 324, pp. 288-293 (2016).
Franco, et al., "The Status of Metal-Supported SOFC Development and Industrialization at Plansee." ECS Trans, vol. 57, pp. 471-480 (2013).
Krishnan, "Recent developments in metal-supported solid oxide fuel cells." Wiley Interdiscip. Rev. Energy Environ, vol. 6, pp. 1-35 (2017) https://doi.org/10.1002/wene.246.
Tucker, et al., "R&D and Commercialization of Metal-Supported SOFC Personal Power Products at Point Source Power." ECS Trans, vol. 57, pp. 503-509 (2013).
Tucker, et al., "Operation of Metal-Supported SOFC with Charcoal Fuel" ECS Trans, vol. 57, pp. 2929-2937 (2013).
Tucker, et al., "A braze system for sealing metal-supported solid oxide fuel cells " J. Power Sources, vol. 160, pp. 1049-1057 (2006).
Tucker, et al., "Stability and robustness of metal-supported SOFCs" J Power Sources, vol. 175, pp. 447-451 (2008).
Tucker, et al., "Performance of metal-supported SOFCs with infiltrated electrodes" J. Power Sources, vol. 171, pp. 477-482 (2007).
Matus, et al. "Metal-supported solid oxide fuel cell membranes for rapid thermal cycling." Solid State Ionics, vol. 176, pp. 443-449 (2005).
Sholklapper, et al., "Synthesis and Stability of a Nanoparticle-Infiltrated Solid Oxide Fuel Cell Electrode." Electrochemical and Solid State Letters, vol. 10, pp. B74-B76 (2007).
Jiang, "Nanoscale and nano-structured electrodes of solid oxide fuel cells by infiltration: Advances and challenges." International Journal of Hydrogen Energy, vol. 37, pp. 449-470 (2012).
Patent Research Foundation, Proximity Report, Report ID D089B8192, 2018.
Tucker, "Development of High Power Density Metal-Supported Solid Oxide Fuel Cells " Energy Technology, vol. 5, pp. 2175-2181, 2017.
Tucker et al., "A braze system for sealing metal-supported solid oxide fuel cells." Journal of Power Sources, vol. 160, pp. 1049-1057, Mar. 31, 2006.
Tucker et al., "Stability and robustness of metal-supported SOFCs." Journal of Power Sources, vol. 175, pp. 447-451, Sep. 18, 2007.
Tucker et al., "Performance of metal-supported SOFCs with infiltrated electrodes." Journal of Power Sources, vol. 171, pp. 477-482, Jun. 23, 2007.
Matus et al., "Metal-supported solid oxide fuel cell membranes for rapid thermal cycling." Solid State Ionics, vol. 176, pp. 443-449, Sep. 17, 2004.
Krishnan, "Recent developments in metal-supported solid oxide fuel cells." Wires Energy and Environment, vol. 6, pp. 1-35, Sep./Oct. 2017.

* cited by examiner

FABRICATION PROCESSES FOR SOLID STATE ELECTROCHEMICAL DEVICES

RELATED APPLICATIONS

This application claims priority to U.S. Provisional Patent Application No. 62/500,738, filed May 3, 2017, which is herein incorporated by reference. This application is related to U.S. patent application Ser. No. 11/911,959, filed Mar. 26, 2008, which is herein incorporated by reference.

STATEMENT OF GOVERNMENT SUPPORT

This invention was made with government support under Contract No. DE-AC02-05CH11231 awarded by the U.S. Department of Energy and under Grant No. 13/CJ000/04/03 awarded by the Department of Energy ARPA-E program. The government has certain rights in this invention.

TECHNICAL FIELD

This disclosure relates generally to solid state electrochemical devices and more particularly to methods of fabricating solid oxide fuel cells.

BACKGROUND

Solid state electrochemical devices are often implemented as cells including two porous electrodes, the anode and the cathode, and a dense solid electrolyte and/or membrane that separates the electrodes. Solid oxide fuel cells are one type of solid state electrochemical devices.

A typical solid oxide fuel cell (SOFC) is composed of a dense electrolyte membrane of a ceramic oxygen ion conductor, a porous anode layer of a ceramic, a metal, or a ceramic-metal composite ("cermet"), in contact with the electrolyte membrane on the fuel side of the cell, and a porous cathode layer of a mixed ionically/electronically-conductive metal oxide on the oxidant side of the cell. Electricity is generated through the electrochemical reaction between a fuel (e.g., hydrogen) and an oxidant (e.g., air). This net electrochemical reaction involves charge transfer steps that occur at the interface between the ionically conductive electrolyte membrane, the electronically conductive electrode, and the vapor phase (fuel or oxygen). The contributions of charge transfer step, mass transfer (gas diffusion in porous electrode), and ohmic losses due to electronic and ionic current flow to the total internal resistance of a solid oxide fuel cell device can be significant. Many solid oxide fuel cells (SOFCs) use yttria-stabilized zirconia (YSZ) as the electrolyte, Ni—YSZ as the supporting anode, and $La_{1-x}Sr_xMnO_{3-\delta}$ (LSM)-YSZ as the cathode.

Metal-supported solid oxide fuel cells (MS-SOFCs) display a number of advantages over conventional all-ceramic SOFCs, including low-cost structural materials (e.g., stainless steel), mechanical ruggedness, tolerance to redox cycling, and fast start-up capability. Challenges for MS-SOFCs include: oxidation of the metal support, especially at 800° C. and higher; the possibility of stainless steel exacerbating Cr poisoning of the cathode catalyst; fabrication- and material-set restrictions arising from the requirement that stainless steel be sintered in reducing atmosphere; and only moderate performance and lifetime have been demonstrated.

These advantages and challenges suggest that MS-SOFCs may be well suited for portable, ruggedized, fast-start, intermittent-fuel, or other unique and innovative applications. MS-SOFC stacks have been developed for direct placement in charcoal cooking stoves, home-scale combined heat and power, and propane-fueled personal device chargers, all applications where conventional all-ceramic SOFCs have limitations. One automobile manufacturer has developed a light-duty prototype vehicle with a conventional SOFC stack for cruising range extension, fueled by bio-ethanol reformate. Because of the desire for rapid-start capability, developing MS-SOFC cell and stack technology for this vehicular application is a priority. The small-volume allowance for the SOFC stack on board a small vehicle furthermore demands high power density from the MS-SOFC.

SUMMARY

One innovative aspect of the subject matter described in this disclosure can be implemented a method of fabricating an electrode structure including: (a) providing an electrode layer comprising a ceramic, the ceramic being porous; (b) providing a catalyst precursor, the catalyst precursor being a cathode catalyst precursor or an anode catalyst precursor; (c) infiltrating the catalyst precursor in a first side of the electrode layer; (d) after operation (c), heating the electrode layer to about 750° C. to 950° C., the catalyst precursor forming a catalyst, the catalyst being a cathode catalyst or an anode catalyst; (e) infiltrating the catalyst precursor in the first side of the electrode layer; and (f) after operation (e), heating the electrode layer to about 300° C. to 700° C., the catalyst precursor forming the catalyst, the catalyst being the cathode catalyst or the anode catalyst. When the catalyst precursor is a cathode catalyst precursor, a cathode catalyst is formed in operations (d) and (f). When the catalyst precursor is an anode catalyst precursor, an anode catalyst is formed in operations (d) and (f).

In some implementations, when the catalyst precursor is infiltrated in the first side of the electrode layer the catalyst precursor is heated to about 90° C. to 95° C. In some implementations, operations of infiltrating the catalyst precursor in the first side of the electrode layer are performed in a vacuum of about 600 millibar to 800 millibar.

In some implementations, the method further includes heating the electrode layer to about 40° C. to 90° C. before operation (d), and heating the electrode layer to about 40° C. to 90° C. before operation (f). In some implementations, the method further includes infiltrating the catalyst precursor in the first side of the electrode layer, and heating the electrode layer to about 300° C. to 700° C., wherein the infiltrating and the heating are performing until a specified amount of the catalyst is deposited on the electrode layer. In some implementations, operations (d) and (f) are performed for about 30 minutes to 5 hours. In some implementations, excess catalyst is removed from the electrode layer after operations (d) and (f).

In some implementations, the ceramic comprises stabilized zirconia or doped ceria. In some implementations, the catalyst precursor comprises a metal salt. In some implementations, the catalyst precursor comprises citric acid. In some implementations, the electrode layer is about 10 microns to 250 microns thick. In some implementations, the method forms a structure comprising a catalyst layer that is about 10 microns to 100 microns thick.

Details of one or more embodiments of the subject matter described in this specification are set forth in the accompanying drawings and the description below. Other features, aspects, and advantages will become apparent from the

BRIEF DESCRIPTION OF THE DRAWINGS

FIG. 4A shows the ohmic and electrode portions of the impedance during heat-up and cool-down of a symmetric cell with LSM 2× and air on both sides. FIG. 4B shows the AC impedance spectra for this cell at 650° C. before and after heating to 850° C. FIG. 4C shows the peak power for cells with LSM 2× and YDCN 2× where the first LSM infiltration (circles), first LSM and YDCN infiltrations (squares), or neither (triangles) were heated to 850° C. and subsequent infiltrations were heated to 600° C.

(FIGS. 5B and 5D) for variation in the number of infiltrations of either LSM (FIGS. 5A and 5B) or SDCN (FIGS. 5C and 5D), with the other electrode held constant at 2× infiltrations.

DETAILED DESCRIPTION

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise.

The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a value is close to a targeted value, where close can mean, for example, the value is within 80% of the targeted value, within 85% of the targeted value, within 90% of the targeted value, within 95% of the targeted value, or within 99% of the targeted value.

A method of forming a mixed electrode of an electrochemical device can include infiltration of a porous structure with a solution of a precursor that results in a particulate layer on the walls of the porous structure. A method can include forming a solution comprising at least one metal salt; infiltrating the solution into a porous structure; and heating the porous structure to substantially decompose the salt to oxide and/or metal particles. The result is a particulate layer on the pore walls of the porous structure.

Figure 9:
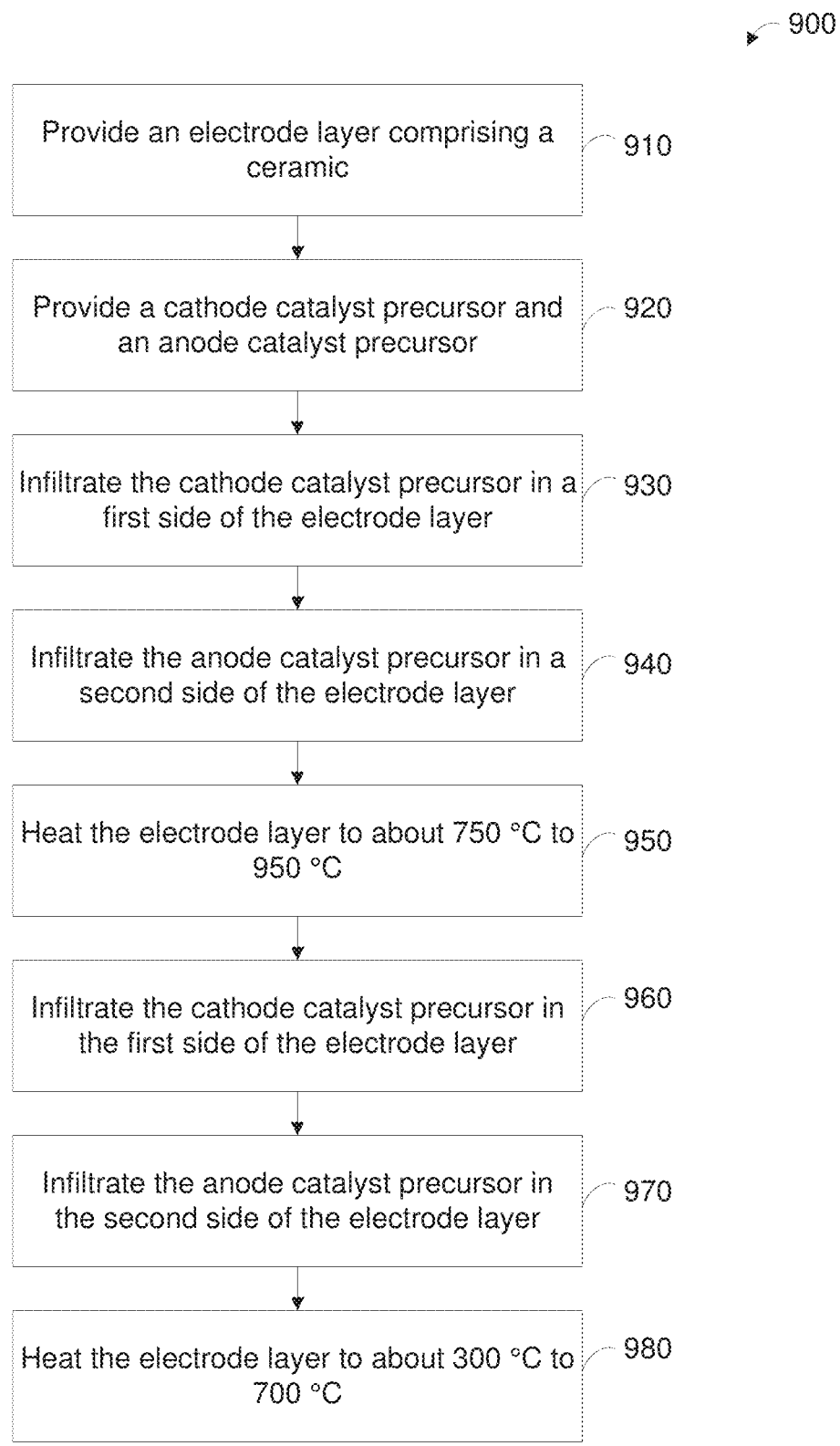
FIG. 9 shows an example of a flow diagram illustrating a manufacturing process for a solid state electrochemical device.

FIG. 9 shows an example of a flow diagram illustrating a manufacturing process for a solid state electrochemical device. Starting at block 910 of the method 900, an electrode layer comprising a ceramic is provided. In some embodiments, the electrode layer is a porous structure. In some embodiments, the electrode layer comprises an ionically conductive material. In some embodiments, the electrode layer comprises stabilized zirconia (e.g., samaria-stabilized zirconia or yttria-stabilized zirconia), doped ceria, doped bismuth oxide, barium zirconate/cerate, alumina, or lithium lanthanum zirconate. In some embodiments, the electrode layer is about 10 microns to 250 microns thick or about 25 microns to 250 microns thick.

At block 920, a cathode catalyst precursor and an anode catalyst precursor are provided. In some embodiments, the cathode catalyst precursor and the anode catalyst precursor each comprise a metal salt (e.g., a metal nitrate salt) and a surfactant. For example, in some embodiments, the cathode catalyst precursor comprises a first metal nitrate salt and the anode catalyst precursor comprises a second metal nitrate salt. In some embodiments, the concentration of total metal ions in the cathode catalyst precursor is about 0.5 moles per liter (mol/L) to 3 mol/L. In some embodiments, the concentration of total metal ions in the anode catalyst precursor is about 0.5 mol/L to 3 mol/L. In some embodiments, the cathode catalyst precursor and the anode catalyst precursor are the same composition.

In some embodiments, the catalyst precursor (e.g., the cathode catalyst precursor or the anode catalyst precursor) is prepared by mixing a surfactant and a solvent (e.g., water) to form a surfactant solution. In some embodiments, the surfactant and water are mixed or stirred for at least 30 minutes (e.g., at room temperature). Mixing the surfactant and water for at least 30 minutes aids in forming a homogenous surfactant solution. In some embodiments, the surfactant comprises a nonionic surfactant, an anionic surfactant, a cationic surfactant, or a polymeric surfactant. For example, the surfactant may comprise polymethylmetacrylic ammoniums salt (PMMA) or polyethylene glycol. In some embodiments, the surfactant comprises a Triton surfactant (e.g., Triton X-100, Sigma Aldrich, St. Louis, Mo.). Triton X-100 ($C_{14}H_{22}O(C_2H_4O)_n$) is a nonionic surfactant that has a hydrophilic polyethylene oxide chain and an aromatic hydrocarbon lipophilic or hydrophobic group (octylphenol ethoxylate). In some embodiments, the metal salts (e.g., metal nitrates) are mixed with the surfactant solution. In some embodiments, the surfactant solution and the metal salts are mixed for at least about 30 minutes at less than about 35° C. to 105° C., or less than about 70° C. The elevated temperature aids in dissolving and/or melting the metal salts.

At block 930, the cathode catalyst precursor is infiltrated in a first side of the electrode layer. In some embodiments, areas of the electrode layer that are not intended to be infiltrated with the cathode catalyst precursor are coated with an acrylic paint mask. The infiltration can be performed, for example, by dipping or immersing the electrode layer in the cathode catalyst precursor.

At block 940, the anode catalyst precursor is infiltrated in a second side of the electrode layer. In some embodiments, areas of the electrode layer that are not intended to be infiltrated with the cathode catalyst precursor are coated with an acrylic paint mask. For example, an acrylic paint mask used at block 930 can be removed (e.g., by burning off or with a solvent) and a different area (e.g., the first side of the electrode layer impregnated with the cathode catalyst precursor) of the electrode layer can be coated with the acrylic paint mask. The infiltration can be performed, for example, by dipping or immersing the electrode layer in the anode catalyst precursor. During the catalyst precursor (e.g., the cathode catalyst precursor or the anode catalyst precursor) infiltration processes, the metal nitrate salts are deposited within the pores and on surfaces of the electrode layer.

In some instances, it may be beneficial to reduce, minimize, or prevent the deposition of catalyst onto one or both metal supports. This may, for example, reduce the cost of the catalyst or prevent coating of the metal support with an additional material that may negatively impact its electronic, mechanical, or oxidation properties. In some embodiments, to reduce catalyst deposition on the metal support, the entire metal support (i.e., including pores in the metal) is covered and filled with a mask material (e.g., an acrylic) prior to infiltrating the ceramic electrode layers with the catalyst precursor(s). In some embodiments, in the case that a mask material is not applied to the metal, the catalyst precursor is infiltrated into both the metal support and porous ceramic electrode backbone, and then removed preferentially from the metal support. The catalyst precursor may be removed from the metal support by applying a wicking material (e.g., paper, sponge, or cloth) or by washing the metal support with water or other solvent for a period of time to dissolve the precursor out of the metal support, but not out of the ceramic electrode.

In some embodiments, the catalyst precursor (e.g., the cathode catalyst precursor or the anode catalyst precursor) is heated during the infiltration process at blocks 930 and 940 to reduce the viscosity of the catalyst precursor. For example, in some embodiments, when the cathode catalyst precursor is infiltrated in the first side of the electrode layer, the cathode catalyst precursor is heated to about 90° C. to 95° C. In some embodiments, when the anode catalyst precursor is infiltrated in the second side of the electrode layer, the anode catalyst precursor is heated to about 90° C. to 95° C. In some embodiments, the temperature of the catalyst precursor is specified so that the catalyst precursor does not boil. For example, 90° C. to 95° C. will not boil the catalyst precursors described in the EXAMPLES.

In some embodiments, the catalyst precursor (e.g., the cathode catalyst precursor or the anode catalyst precursor) is mixed with an acid (e.g., citric acid) to reduce the viscosity of the catalyst precursor during the infiltration process. In some instances, the addition of an acid to the catalyst precursor results in a low-viscosity solution at room temperature. In some embodiments, the cathode catalyst precursor and the anode catalyst precursor each comprise citric acid. The use of citric acid in the catalyst precursors may allow for different methods of catalyst infiltration, such as spray method. In some embodiments, the concentration of the citric acid is about 0.1 moles per liter (mol/L) to 2.5 mol/L.

In some embodiments, to aid in filing of pores in the electrode layer during the infiltration processes, the infiltration processes are performed under vacuum. This aids in the removal of air from the electrode layer. For example, in some embodiments, operations of infiltrating the cathode catalyst precursor in the first side of the electrode layer are performed in a vacuum of about 600 millibar to 800 millibar, or about 600 millibar. In some embodiments, operations of infiltrating the anode catalyst precursor in the second side of the electrode layer are performed in a vacuum of about 600 millibar to 800 millibar, or about 600 millibar. The vacuum level can be chosen to avoid boiling of the precursor.

Returning to the method 900 shown in FIG. 9, after blocks 930 and 940, at block 950 the electrode layer is heated to about 750° C. to 950° C. In some embodiments, the electrode layer is heated to about 850° C. In some embodiments, the heat treatment is performed for about 30 minutes to 5 hours, or about 30 minutes to 1 hour. During the heat treatment, the cathode catalyst precursor forms a cathode catalyst and the anode catalyst precursor forms an anode catalyst. These catalysts provide at least one of an electronic conduction pathway, an ionic conduction pathway, and a catalytic surface, and typically provide all three.

For example, the metal salts of the catalyst precursors decompose to form oxides (i.e., a cathode catalyst and an anode catalyst). Also, when the metal salts decompose, particles of the oxides are formed. The result is a particulate layer of the oxides on the pore walls and on surfaces of the electrode layer. In some embodiments, the cathode catalyst is selected from a group consisting of lanthanum strontium manganite (LSM), lanthanum strontium cobaltite (LSC), lanthanum strontium ferrite (LSF), samarium strontium cobaltite (SSC), lanthanum strontium cobalt ferrite (LSCF), barium strontium cobalt ferrite (BSCF), samarium strontium cobaltate (SSC), neodymium nickel oxide (NNO), praseodymium nickel oxide (PNO), lanthanum nickel oxide (LNO), lanthanum nickel ferrite (LNF), nickel and doped ceria, doped ceria, doped zirconia, and praseodymium oxides ($Pr_6O_{11}$), and mixtures thereof. In some embodiments, the anode catalyst is selected from a group consisting of nickel-doped strontium titanate, lanthanum-doped strontium titanate, yttrium-doped strontium titanate, niobium titanate, strontium manganese magnesium oxide, nickel and doped ceria (e.g., samaria-doped ceria (SDC) or yttria-doped ceria (YDC), with a volume ratio of doped ceria to nickel of about 80:20 to 20:80, or 60:40 to 40:60), manganese and iron doped ceria (CMF), manganese and iron doped nickel and doped ceria (CMFN), and mixtures thereof.

The method is not limited to infiltration of a single catalyst composition. Binary, ternary, or other multi-phase composite catalysts may be desirable. In some embodiments, two, three, four, five, or six different catalyst precursors are infiltrated in the first side or the second side of the electrode layer. The catalyst composite should provide functionality of high electronic conductivity, high electronic conductivity, and high electrocatalysis. Each phase can provide multiple functions, but it is recognized that certain compositions may dominate one of these functions. For example, a ternary cathode catalyst can be fabricated by infiltrating a catalyst phase A that provides good electronic conduction, phase B that provides good ionic conduction, and phase C that acts as bulk catalyst. An embodiment of this scheme is an anode catalyst comprising SDC (phase B) and Ni (phase C). Another embodiment of this scheme is a cathode catalyst comprising LSM (phase A), SDC (phase B), and $PrO_x$ (e.g., typically $Pr_6O_{11}$) (phase C). Yet another embodiment of this scheme is a cathode catalyst comprising Samarium Strontium Cobaltate (SSC) (phase A), SDC (phase B), and $PrO_x$ (phase C). Multiple catalysts can be infiltrated successively, or their precursors may be mixed. The arrangement, the number of depositions, and the thickness of each layer can vary. For example, options for deposition of binary catalysts include ABAB, AABB and A-B-mixed precursor. Likewise, options for deposition of ternary catalysts include ABC, AABBCC, ABCABC, and A-B-C-mixed precursor.

Additionally, reforming catalysts such as Ni, Cu, or Ru may be added to the anode to chemically convert complex fuels to hydrogen and/or carbon monoxide, which are then used electrochemically to produce electricity. Complex fuels include natural gas, ammonia, dimethyl ether, kerosene, methane, propane, ethanol, methanol, propanol, and mixtures thereof. Phases that suppress poisoning or coking of the catalyst may also be infiltrated, including ceria. For example, a ternary anode catalyst can be fabricated by infiltrating nickel (phase D), samaria and nickel doped ceria (phase E), and ceria (phase F), giving a DEF configuration, with each layer carrying a specific function to enhance the overall functionality of the anode. For example, phase D may provide good electronic conduction and catalysis at the triple phase boundary, phase E may act as both catalyst and also prevent coking (carbon solidification on anode) from the hydrocarbon fuels, and phase F may prevent initial coking from the hydrocarbon fuels.

In the heat treatment at block 950, the oxide particles can grow and form a continuous network. A continuous network provides for improved electronic and/or ionic conduction. The heat treatment at block 950 helps in generating interparticle contact between the oxide particles. The interparticle contact is generated, for example, by sintering or coarsening.

In some embodiments, prior to block 950, the electrode layer is heated to about 40° C. to 90° C., or about 80° C. In some embodiments, this low temperature heat treatment is performed for about 30 minutes to 1 hour. This operation serves to drive off any solvent (e.g., water) remaining in the cathode catalyst precursor or the anode catalyst precursor.

In some embodiments, after block 950 excess cathode catalyst and excess anode catalyst are removed from the electrode layer. For example, this can be accomplished by blowing the electrode layer with compressed air.

At block 960, the cathode catalyst precursor is infiltrated in the first side of the electrode layer. The operation at block 960 is the same as or similar to the operation at block 930.

At block 970, the anode catalyst precursor is infiltrated in the second side of the electrode layer. The operation at block 970 is the same as or similar to the operation at block 940.

After blocks 960 and 970, at block 980 the electrode layer is heated to about 300° C. to 700° C. In some embodiments, the electrode layer is heated to about 600° C. In some embodiments, the heat treatment is performed for about 30 minutes to 5 hours, or about 30 minutes to 1 hour. During the heat treatment, the cathode catalyst precursor forms the cathode catalyst and the anode catalyst precursor forms the anode catalyst. In the heat treatment at block 980, the oxide particles do not grow, coarsen, and potentially coalesce as much as in block 950, forming a surface having a high surface area. In some embodiments, the oxide particles remain smaller than about 100 nm, or smaller than about 50 nm.

Thus, the structure that is formed on the surfaces and in the pores of the electrode layer is a first layer of catalyst that provides for good electronic and/or ionic conduction with a second layer of catalyst disposed on the first layer. The second layer provides a high surface area for catalysis. While these two catalyst layers are not necessarily distinct, this is a way in which to envision the catalyst layers that are formed. The two catalyst layers formed at block 950 and at block 980 can be the same compositions or different compositions.

In some embodiments, the temperatures of the heat treatments at block 950 and 980 are specified such that the first heat treatment is at a temperature above the operating temperature of the solid state electrochemical device and the second heat treatment is at a temperature at or lower than the operating temperature of the solid state electrochemical device. The solid oxide fuel cells described in the EXAMPLES are generally operated at about 700° C.

In some embodiments, prior to block 980, the electrode layer is heated to about 40° C. to 90° C., or about 80° C. In some embodiments, this low temperature heat treatment is performed for about 30 minutes to 1 hours. This operation serves to drive off any solvent (e.g., water) remaining in the cathode catalyst precursor or the anode catalyst precursor.

In some embodiments, after block 980 excess cathode catalyst and excess anode catalyst are removed from the electrode layer. For example, this can be accomplished by blowing the electrode layer with compressed air. Removing excess catalyst (e.g., catalyst not attached to the electrode layer) may improve the effectiveness of additional infiltration operations as well as allowing for good gas transport in a functioning device.

To obtain a specified amount of cathode catalyst and anode catalyst on the electrode layer, additional infiltrations followed by heat treatments at about 300° C. to 700° C., or about 600° C., can be performed. Operations to form additional cathode catalyst, operations to form additional anode catalyst, and operations to form both additional cathode catalyst and additional anode catalyst can be performed. For example, in some embodiments, the cathode catalyst precursor is infiltrated in the first side of the electrode layer and then the electrode layer is heated to about 300° C. to 700° C. In some embodiments, there are a total of about 2 to 3 cathode catalyst formation operations (e.g., infiltration followed by heat treatment) in the fabrication of a solid oxide fuel cell. In some embodiment, the anode catalyst precursor is infiltrated in the second side of the electrode layer and then the electrode layer is heated to about 300° C. to 700° C. In some embodiments, there are a total of about 5 to 7, or about 6, cathode catalyst formation operations (e.g., infiltration followed by heat treatment) in the fabrication of a solid oxide fuel cell.

In some embodiments, subsequent heat treatments (to form oxides from the catalyst precursor) and subsequent operations in the fabrication of the solid state electrochemical device (e.g., glass sealing of the solid state electrochemical device) are performed at the heat treatment temperature used at block 980 or at lower temperature. This aids in preserving the high surface area of the catalyst by preventing growth, coarsening, and potential coalescence of the oxide particle with the subsequent processing.

The structure fabricated by performing the method 900 comprises a cathode catalyst layer, an anode catalyst layer and an electrolyte layer disposed between the cathode catalyst layer and the anode catalyst layer. In some embodiments, the cathode layer is about 10 microns to 100 microns thick, or about 20 microns to 35 microns thick. In some embodiments, the anode catalyst layer is about 10 microns to 100 microns thick, or about 20 microns to 35 microns thick. In some embodiments, the electrolyte layer is about 5 microns to 50 microns thick, or about 5 microns to 15 microns thick. In some embodiments, the cathode catalyst layer and the anode catalyst layer are the same thickness.

In the method 900, both cathode catalyst and anode catalyst are deposited on the electrode layer. In some embodiments, the method 900 is implemented to deposit a cathode catalyst on the electrode layer and not an anode catalyst. Such a method would not include operations involving the anode catalyst precursor or the anode catalyst in the method 900. In some embodiments, the method 900 is implemented to deposit an anode catalyst on the electrode layer and not a cathode catalyst. Such a method would not include operations involving the cathode catalyst precursor or the cathode catalyst in the method 900. For example, a first side of an electrode layer comprising Ni—YSZ cermet may be infiltrated with a cathode catalyst to form an electrode structure comprising a Ni—YSZ cermet and a cathode catalyst layer.

The following examples are intended to be examples of the embodiments disclosed herein, and are not intended to be limiting. The following examples are related to the fabrication of solid oxide fuel cells. The methods described in the examples, however, are applicable to other solid state electrochemical devices with porous electrodes comprising a ceramic, including alkali metal thermal to electric converters, lithium and other types of battery, solid oxide electrolysis cells, solid oxide chemical reactors, solid oxide separation membranes, electrochemical compression cells, and regenerative or reversible fuel cell/electrolysis cells.

Example 1—Solid Oxide Fuel Cell Fabrication and Testing

Efforts to develop co-sintered, yttria-stabilized zirconia (YSZ)-based MS-SOFCs with porous metal supports on both anode and cathode sides and catalysts deposited into both electrodes through infiltration are described below. These features can provide for a mechanically rugged cell that can be processed with low-cost scalable techniques and high-surface-area catalysts with excellent performance by avoiding interdiffusion or catalyst coarsening during cell sintering. To support a vehicular application, in this work catalyst infiltration processing for MS-SOFCs was further developed to increase power density. One goal was to increase cell performance by improving infiltration of conventional catalyst compositions (lanthanum strontium manganite (LSM), Ni, doped ceria) into electrode backbones of conventional YSZ. This was accomplished by improving various aspects of the infiltration process, including precursor composition, catalyst loading, crystallization temperature, and method of introducing the precursor into the porous electrode backbone.

Figure 1A:
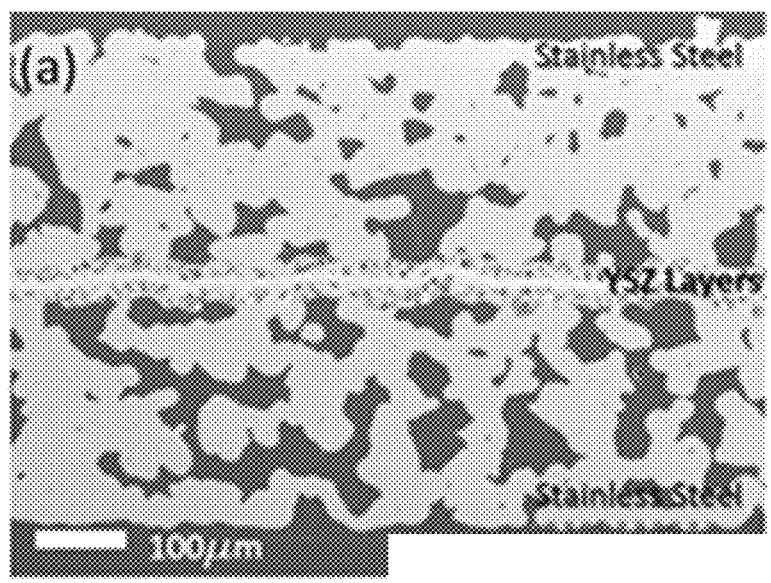
FIGS. 1A and 1B show example of SEM images of a polished cross section of MS-SOFC structure after sintering and before catalyst infiltration.
Figure 1B:
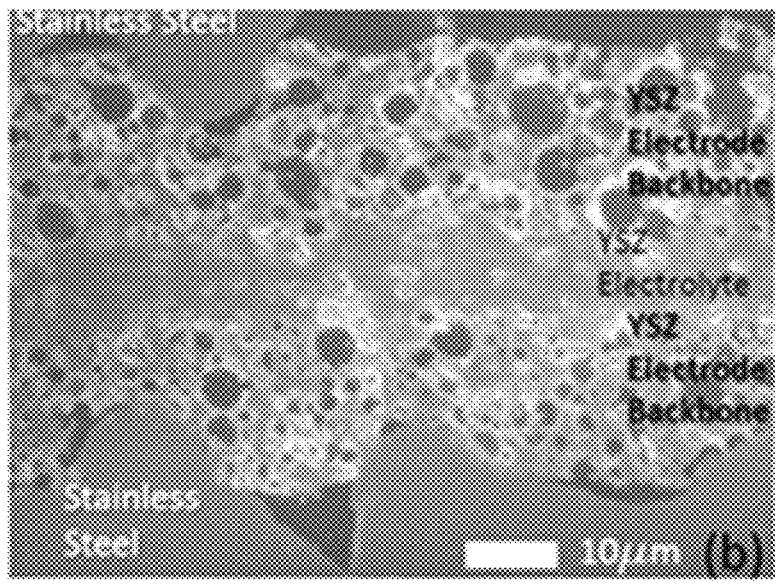
Figure 1C:
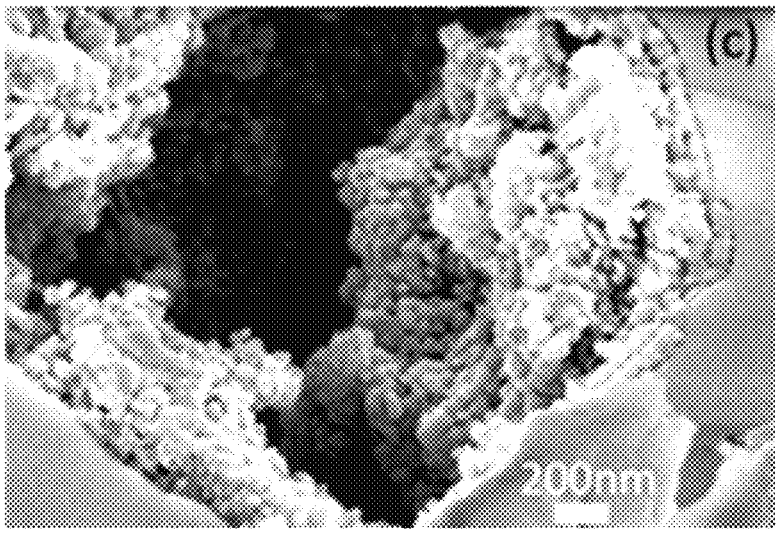
FIG. 1C shows an example of an SEM image of cathode pores after infiltration of LSM.

The metal and YSZ backbone structure of the MS-SOFC, without infiltrated catalysts, is shown in FIGS. 1A and 1B. Cells were laser-cut from laminated tape-cast layers and can be fabricated in a range of sizes and shapes. Lab-scale cells of 30 mm diameter and 1-4 $cm^2$ active area with infiltrated catalysts were used throughout this work. As cell performance increased, a smaller active area was used to keep the maximum current within the limit of the potentiostat. Previous experiments indicated that cell performance is independent of active area in this range. The cross-section SEM images reveal a highly porous metal support on both sides of the cell surrounding the thin active ceramic layers. The dense YSZ electrolyte layer is approximately 10 µm thick. Mechanical interlocking between the rough metal surface and porous YSZ electrode layers provides adequate bonding to maintain cell integrity. Suitable pore-former loading in the porous YSZ electrode layers allows infiltration of the catalyst throughout the layer and gas transport during operation without sacrificing mechanical integrity of the electrode. FIG. 1C shows the LSM catalyst deposited within a pore in the YSZ electrode layer. The LSM adheres to the pore wall, leaving pore space open for gas transport. The primary catalyst particles are about 50-100 nm in size.

As can be seen in FIGS. 1A-1C, the stainless steel-and-YSZ cell architecture is symmetric. This suggests that small differences in sintering rate or coefficient of thermal expansion between the stainless steel and YSZ do not lead to warping of the cell. It is anticipated this will be an advantage for deployment of large MS-SOFC stacks, where large thermal gradients can be expected during fabrication and operation.

Figure 2:
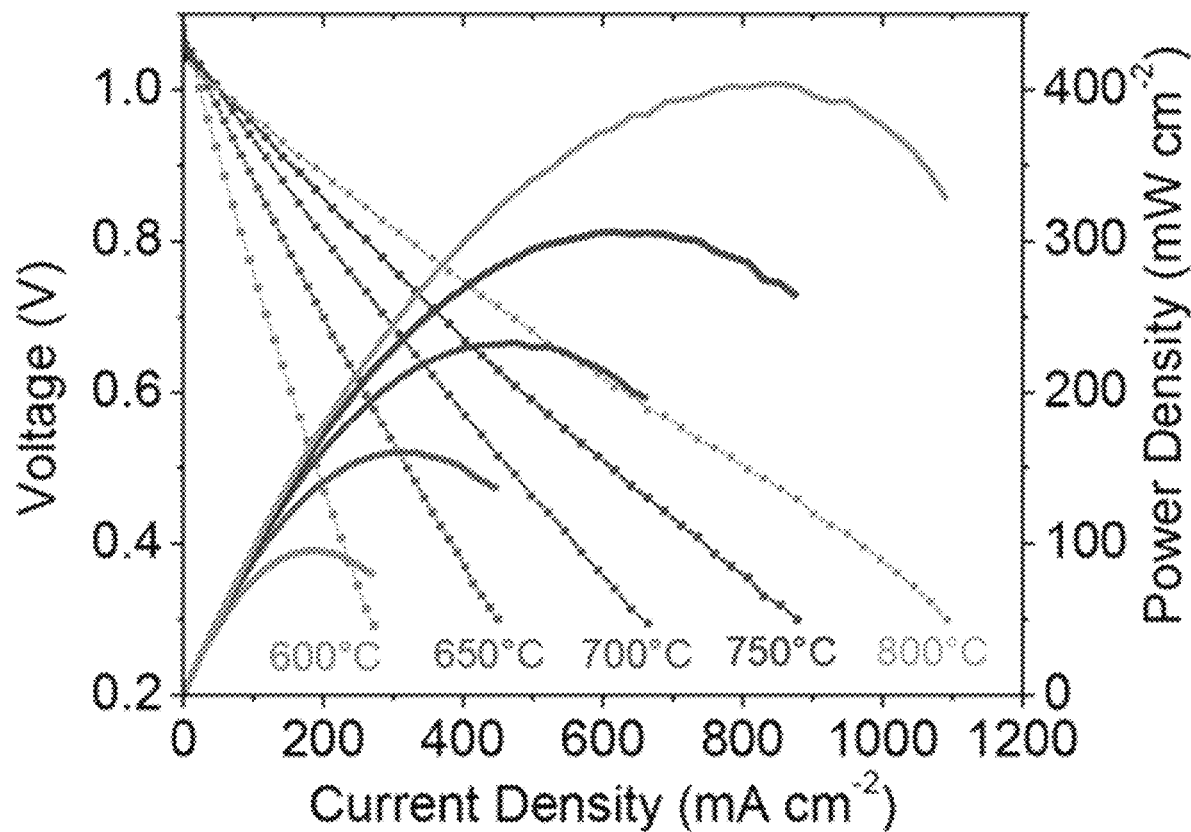
FIG. 2 shows the polarization performance of baseline cell with LSM infiltrated twice (2×) and YDCN 2× calcined at 600° C.

A baseline cell using LSM as cathode and yttria-doped ceria mixed with nickel (YDCN) [80:20 v/v] as anode was assembled using infiltration techniques. The choice to use an anode composition with doped ceria and minimal amount of Ni arises from the rapid coarsening observed for infiltrated Ni when using hydrogen as fuel. The performance with hydrogen as fuel is shown in FIG. 2. Every 100° C. increase in operation temperature leads to roughly a doubling of power density. The performance is similar to previous tubular cells operated with air and hydrogen using Ni as anode catalyst, and five times better than similar planar cells operated with charcoal fuel, where gasification of the charcoal to $H_2$ and CO limited cell performance. The linear polarization curve suggests minimal activation or mass transport overpotentials.

To improve performance beyond that discussed in the sections above, a systematic variation of several features of the infiltration process was undertaken. The intention was to identify those features that have a large impact on cell performance and improve them.

Figure 3:
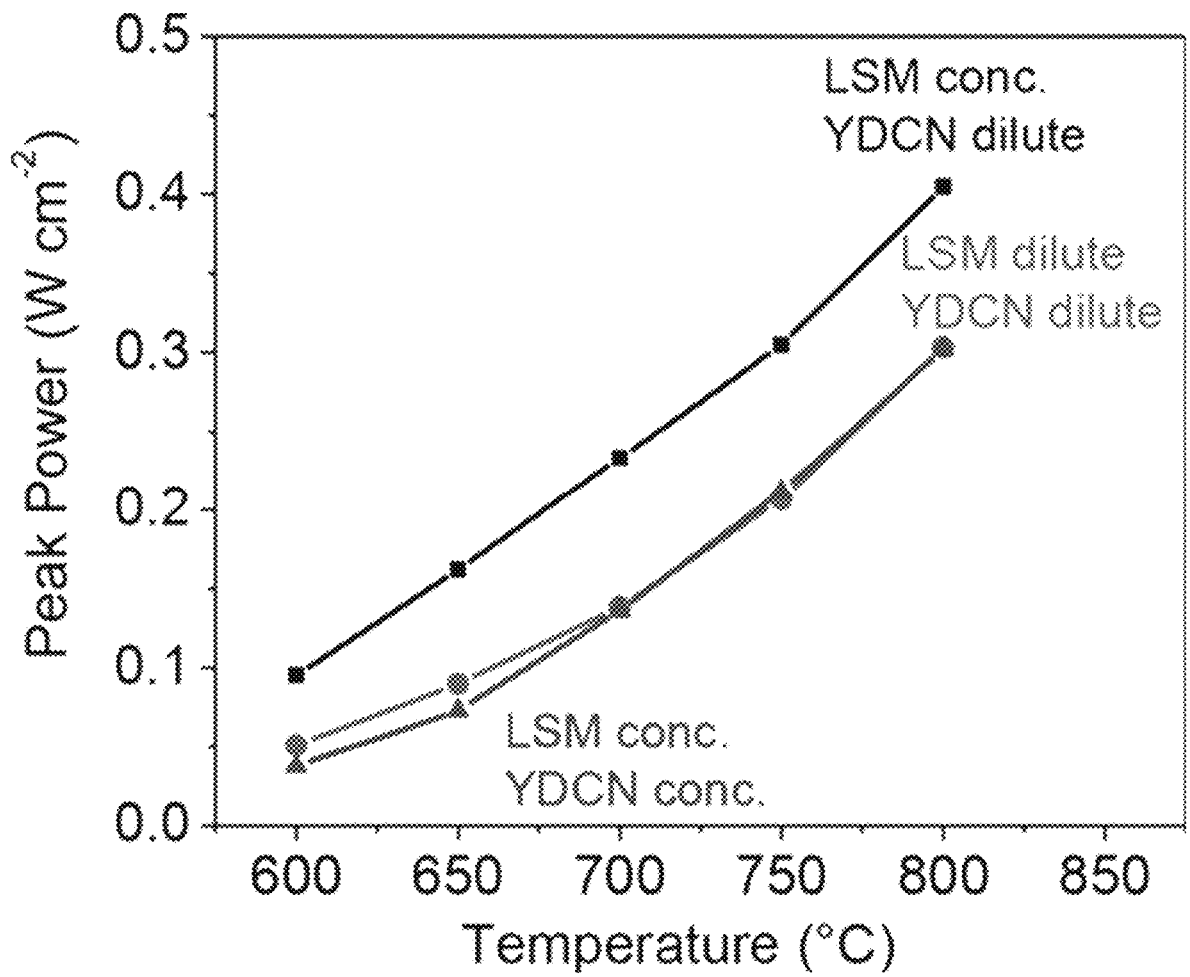
FIG. 3 shows the impact of precursor concentration for LSM 2× and YDCN 2× with either 20 wt % additional water (concentrated) or 100 wt % additional water (dilute). LSM concentrated and YDCN dilute (squares), both dilute (circles), and both concentrated (triangles).

The catalyst precursor salts melt in the range 37-96° C. (except strontium nitrate, which must be dissolved), allowing a highly concentrated molten-salt bath to be prepared by heating to around 100° C. Addition of water to the salt mixture, however, enhances the ability to prepare a clear, low-viscosity, low surface-tension solution that remains a liquid over a large temperature range, making it easier to infiltrate into the cell. The trade-off is that water addition dilutes the precursor, resulting in less catalyst deposited within the cell for each infiltration cycle. Precursors with 20 wt % additional water ("concentrated") and 100 wt % additional water ("diluted") were assessed. As shown in FIG. 3, the best performance was found for concentrated LSM and diluted YDCN. This is consistent with the observation that LSM precursor melts around 65° C. (far below the infiltration temperature of 90° C.); thus, excess water is not needed to keep it from solidifying. In contrast, dry YDCN precursor melts at around 85° C.; as a result, it can easily crystallize before infiltration is complete if the cell temperature decreases by a few degrees. It was later found that 40 wt % water addition to the YDCN anode precursor is sufficient to prevent crystallization during infiltration, which was used for improved cell fabrication.

Previous work has used samaria-doped ceria (SDC) and yttria-doped ceria (YDC). Both dopants were compared here. SDC gave rise to marginally higher performance and was therefore selected for all following cell fabrications. Infiltrated Ni is known to coarsen quickly during operation, and addition of doped ceria can stabilize the Ni particles and reduce degradation rate. Previous work used a SDC/Ni volume ratio of 80:20, and that ratio was maintained here. A limited number of cells were also produced with a higher Ni content.

Figure 4A:
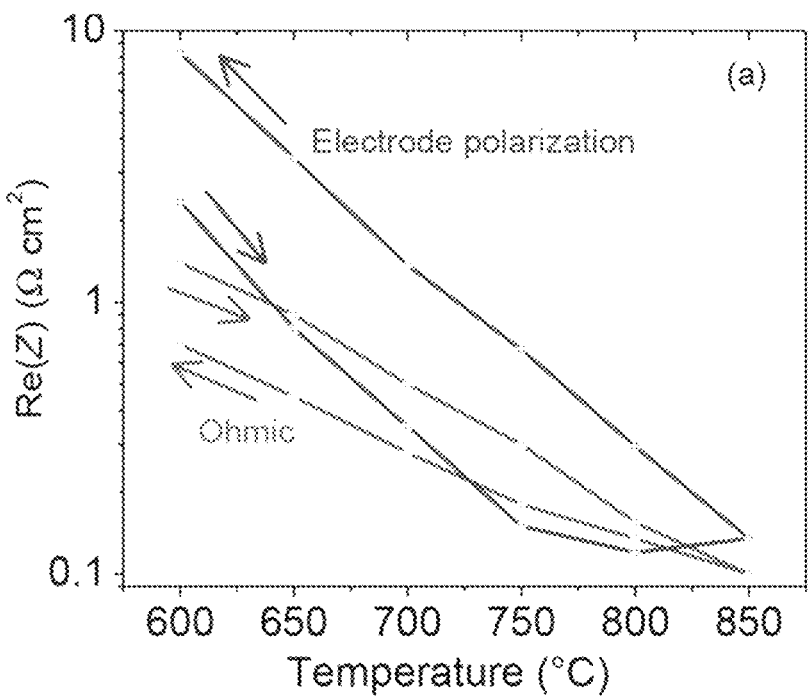
FIGS. 4A-4C show the effect of crystallization temperature.
Figure 4B:
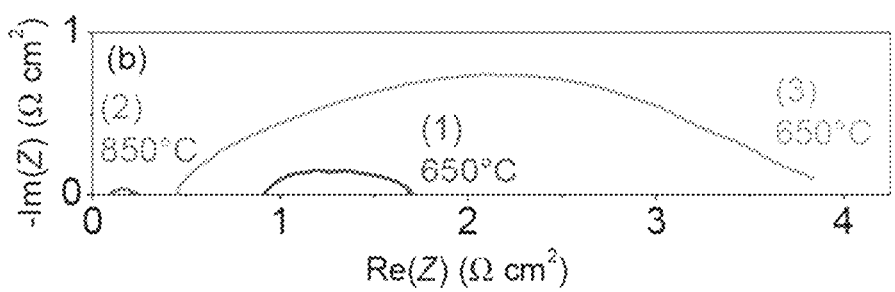
Figure 4C:
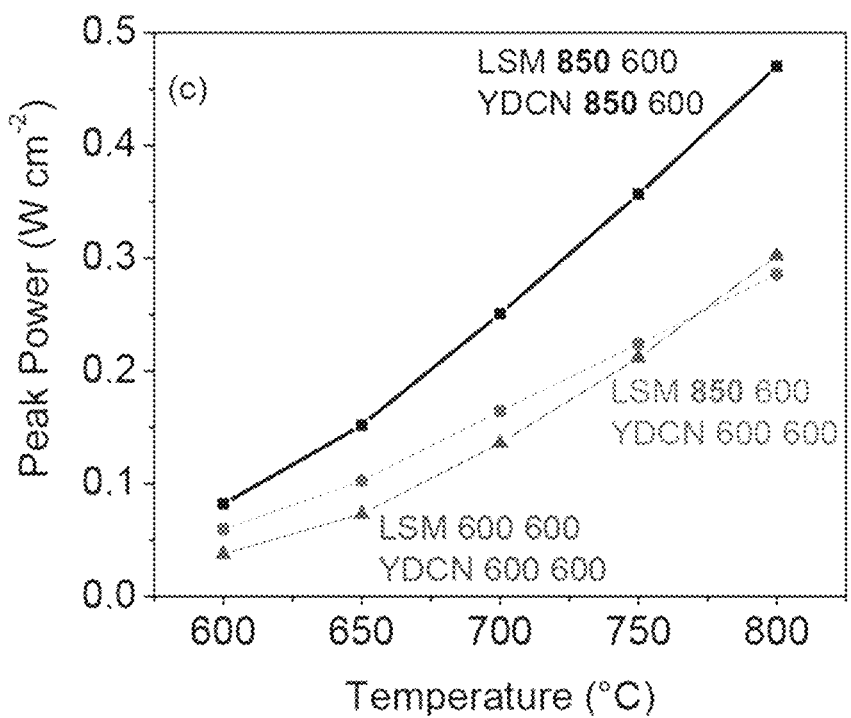
Figure 5A:
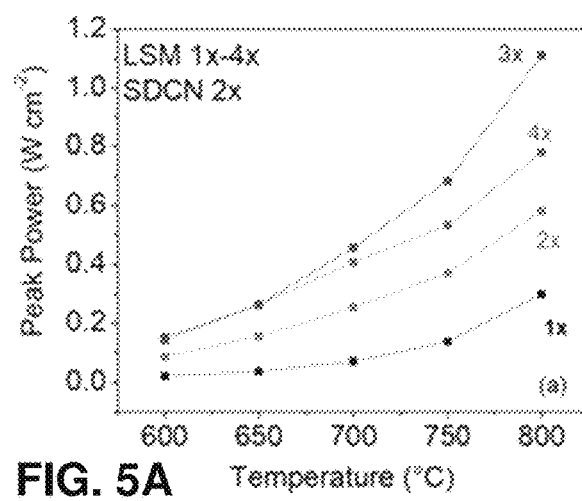
FIGS. 5A-5D show the effect of catalyst loading-peak power (FIGS. 5A and 5C) and impedance components at 700° C.
Figure 5C:
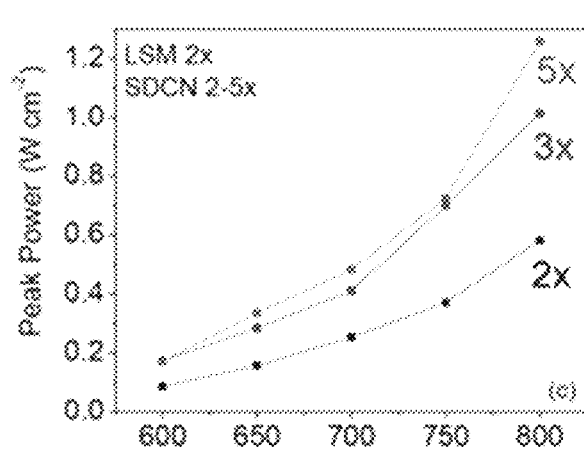
Figure 5B:
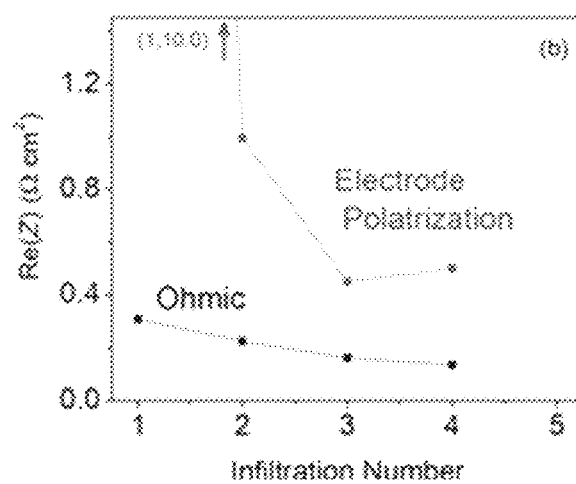
Figure 5D:
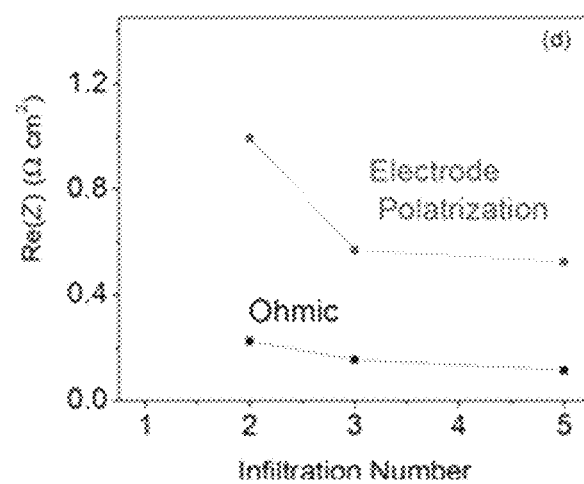

The nitrate precursors convert to oxides around 230° C. and crystallize around 560° C. Cells were heated to 600° C. or higher to ensure complete conversion to the desired phase. During cell development, it was noticed that the ohmic impedance of a LSM/LSM symmetric cell improved after operation in air at 850° C., as shown in FIGS. 4A and 4B. It is surmised that higher temperature leads to improved crystallization or particle-to-particle sintered connection of the catalysts, leading to increased electronic conductivity. Higher temperature also leads to coarsening of the catalysts, resulting in lower surface area and significantly higher electrode polarization impedance (FIG. 4B). Based on this hypothesis, cells were fabricated with either the first cathode or both the first anode and first cathode infiltrations heated to 850° C. to provide a good electronic network, followed by subsequent infiltrations heated to 600° C. to provide high surface area. The intended impact on conductivity was achieved: ohmic impedance was 0.89, 0.55, and 0.50 $\Omega cm^{-2}$ for neither, cathode, and both electrode first infiltrations heated to 850° C., respectively. As shown in FIG. 4C, treating both the anode and cathode first infiltrations at high temperature significantly improved performance.

The amount of catalyst introduced by each infiltration cycle can be estimated from the precursor and catalyst densities, assuming complete flooding of the pores with catalyst precursor. The filling factors are low: for Ni, SDC, and LSM, 3, 10, and 15%, respectively, of the pore volume is filled with catalyst for each infiltration cycle. Addition of water further reduces these filling factors. Because of these low filling factors, it is desirable to infiltrate multiple times to increase catalyst loading. At low loading, low catalyst surface area and poor electronic connection between catalyst particles limits performance. At high loading, pore filling may limit mass transport and cost increases. To demonstrate the impact of catalyst loading on performance, the cell power and AC impedance components at 700° C. are shown in FIGS. 5A-5D as a function of the number of infiltration cycles. The ohmic impedance decreased moderately with increasing infiltrations as electronic percolation improves.

For both LSM and SDC mixed with nickel (SDCN), electrode polarization impedance dropped up to three infiltrations and then plateaued for more infiltrations in the range studied. Therefore, three infiltrations (3×) were selected to balance high performance and catalyst consumption.

Application of mild vacuum to the cells during infiltration has previously been performed. This helps remove air from the porous structure, ensuring complete filling of the pores with catalyst precursor in the event that capillary wetting forces are not sufficient. Application of vacuum, however, is time consuming, removes water from the precursor solution (thereby changing the concentration), and adds cost to the production process. An alternative solvent-assisted vacuum-free process was previously proposed wherein a solvent with low boiling point and low surface tension (e.g., ethanol, acetone) is flooded into the pores before the cell is submerged in the catalyst precursor bath. Upon contacting the hot precursor solution, the solvent boils off and evacuates the pores, thereby promoting flooding of the pores by precursor. That technique was applied here to assess its suitability for a processing scheme with the goal of high cell power density.

Figure 6:
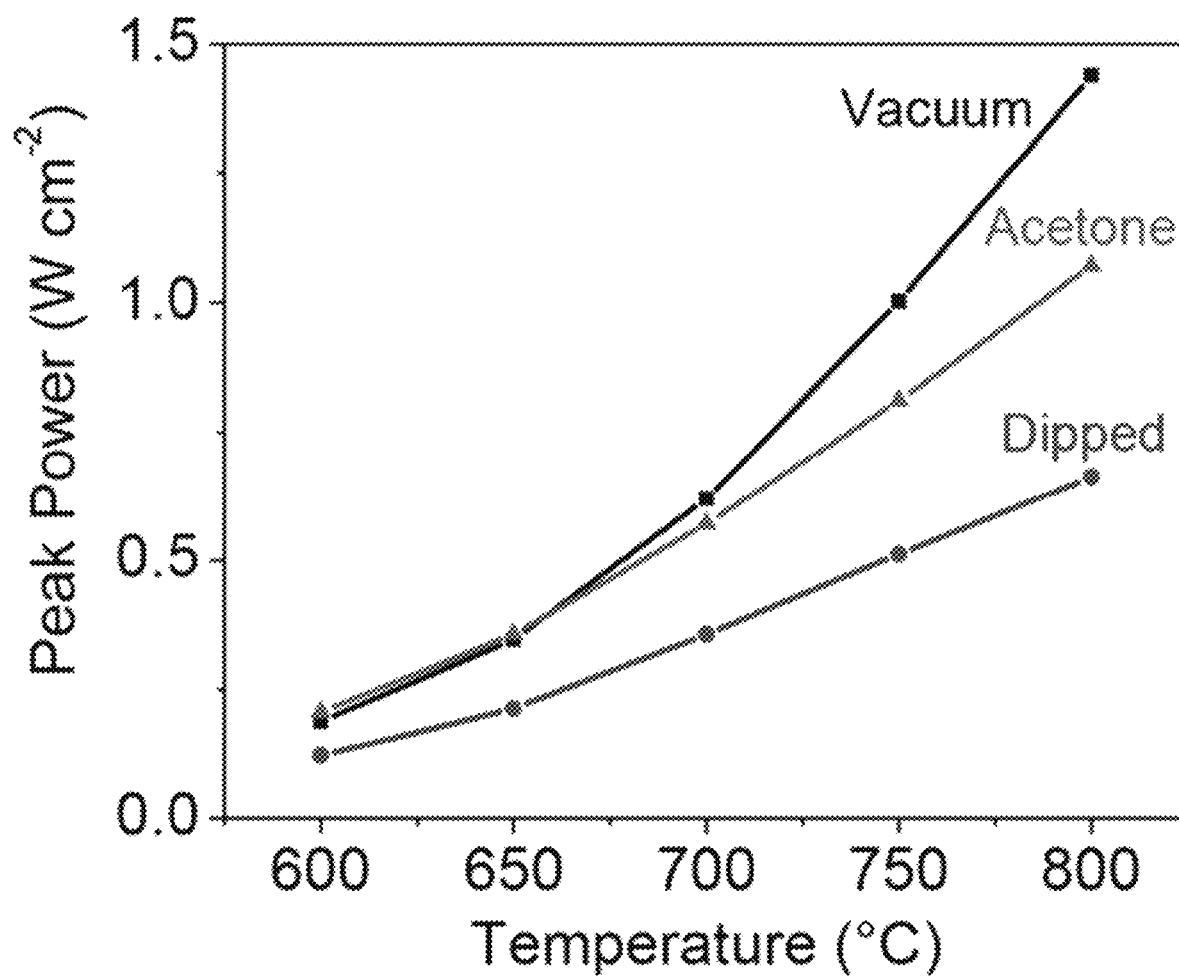
FIG. 6 shows the effect of vacuum-assisted (squares) or acetone-assisted infiltration (triangles), compared to cell simply dipped into the precursor solution (circles).

FIG. 6 shows the peak power density achieved for cells processed with the solvent-assisted infiltration procedure and standard procedure developed in the previous sections. Also shown is performance of a baseline cell that had neither vacuum nor solvent applied, but rather was simply dipped and held in the precursor bath for the standard time, about 10 s. Both the solvent and vacuum techniques provided higher performance than the simple dipping. Although capillary forces are quite strong and can be expected to completely flood a cell dipped into a well-wetting solution, it is clear that the viscous, highly concentrated solutions used here to minimize repetition of the infiltration procedure require extra measures to completely flood the pores. Although the solvent-assisted infiltration procedure is promising and may benefit from further development, it did not exceed the standard vacuum-assisted process and so was not pursued further in this work.

Figure 7A:
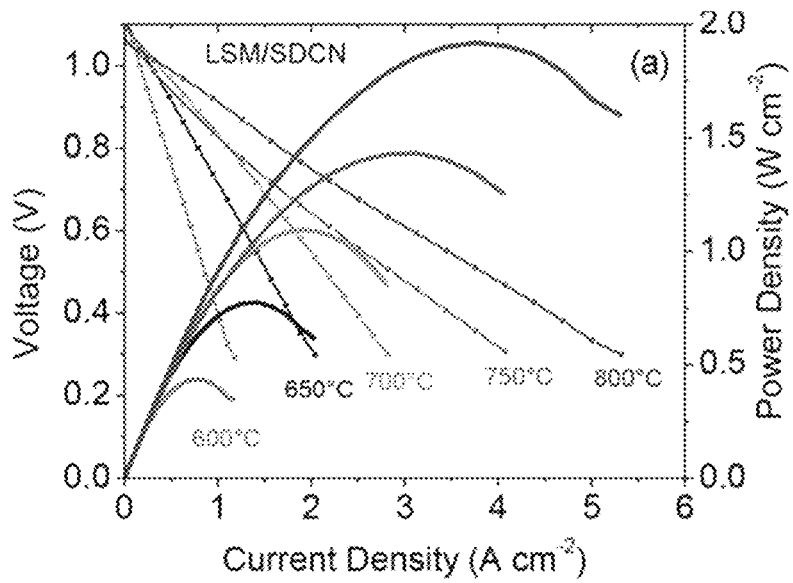
FIGS. 7A and 7B show the polarization performance for improved cells with (FIG. 7A) LSM 3×/SDCN 3× and (FIG. 7B) SDCN 3×/SDCN 3× in both electrodes.

Improved cells were fabricated using the best infiltration practices determined above: LSM with 20 wt % water added and SDCN with 40 wt % water added; SDCN rather than YDCN; both anode and cathode heated to 850° C. on the first infiltration cycle, and then 600° C. on subsequent cycles; three infiltration cycles total for each side of the cell; and, vacuum-assisted infiltration. The resulting cell performance is shown in FIG. 7A. Improvement was achieved relative to the baseline performance shown in FIG. 2. The 1.9 W cm$^{-2}$ obtained at 800° C. is the highest power density reported for stainless-steel-supported SOFCs to date (slightly higher power was reported for a cell with lanthanum strontium gallium magnesium oxide (LSGM) electrolyte deposited on Fe—Ni substrate). These results indicate the importance of improving and controlling the infiltration procedure, and it is expected that the improvements identified here will not introduce significant additional cost, if any. Furthermore, these improvements were achieved with long-standing conventional SOFC active materials (YSZ, LSM, doped ceria, and Ni). Further improvement through substitution of these materials by higher-performance materials reported more recently is the subject of future work.

Figure 7B:
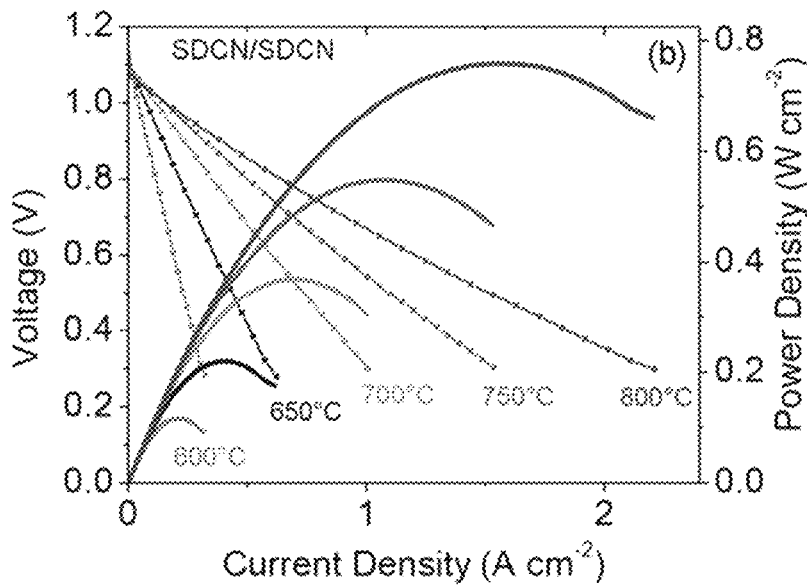
Figure 7C:
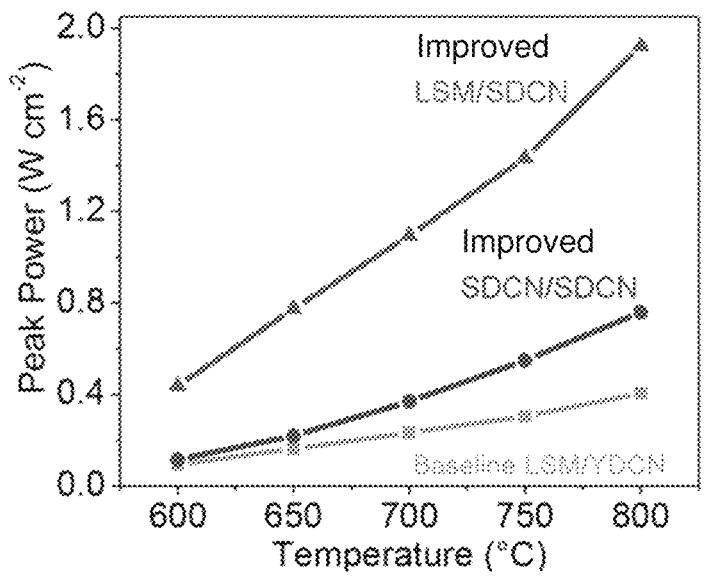
FIG. 7C shows a comparison of peak power density for improved LSM/SDCN and SDCN/SDCN to results for the baseline cell of FIG. 2.

FIG. 7B shows performance for a completely symmetric cell, in which not only the YSZ and stainless steel structure were symmetric but also in which SDCN was used as the catalyst for both anode and cathode. This approach was used previously to make infiltration simpler (the cell can be dunked in a precursor bath without any masking), remove the need for tracking which side of the cell is which during stack assembly, and overcome rapid degradation of the LSM through Cr contamination in the presence of K-containing biomass fuel. Recently, symmetric MS-SOFCs with infiltrated $La_{0.6}Sr_{0.4}Fe_{0.9}Sc_{0.1}O_{3-\delta}$ (LSFSc) on both sides achieved 0.3 and 0.65 W cm$^{-2}$ at 700 and 800° C., respectively. The performance obtained here for symmetric SDCN was slightly higher, at 0.37 and 0.76 W cm$^{-2}$ at 700 and 800° C., respectively, and is among the highest reported for symmetric SOFCs of any type. The precise mechanism of SDCN cathode catalysis is not clear. It has been noted, however, that nanoscale-doped ceria can present mixed conduction in air due to the large influence of grain boundaries relative to bulk. LSM is a much better cathode catalyst than SDCN as seen in FIG. 7C, but a symmetric cell with moderate power density may be interesting for some applications.

Figure 8A:
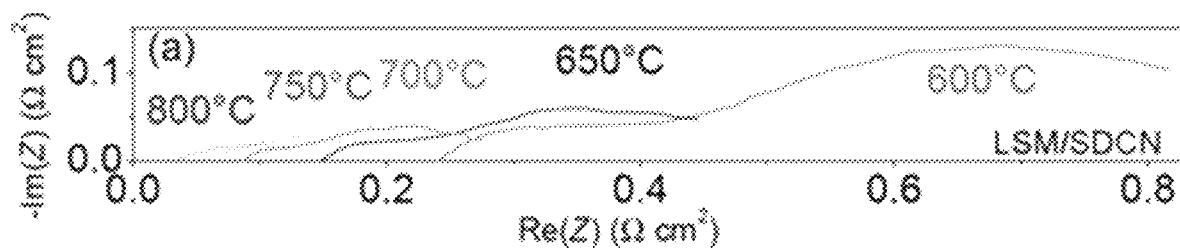
FIGS. 8A and 8B show AC impedance spectra for improved cells with (FIG. 8A) LSM 3× and SDCN 3×, and (FIG. 8B) symmetric SDCN 3× in both electrodes.
Figure 8B:
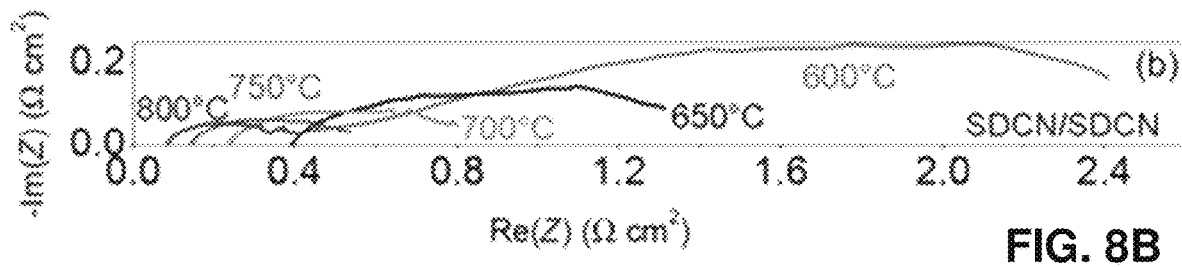
Figure 8C:
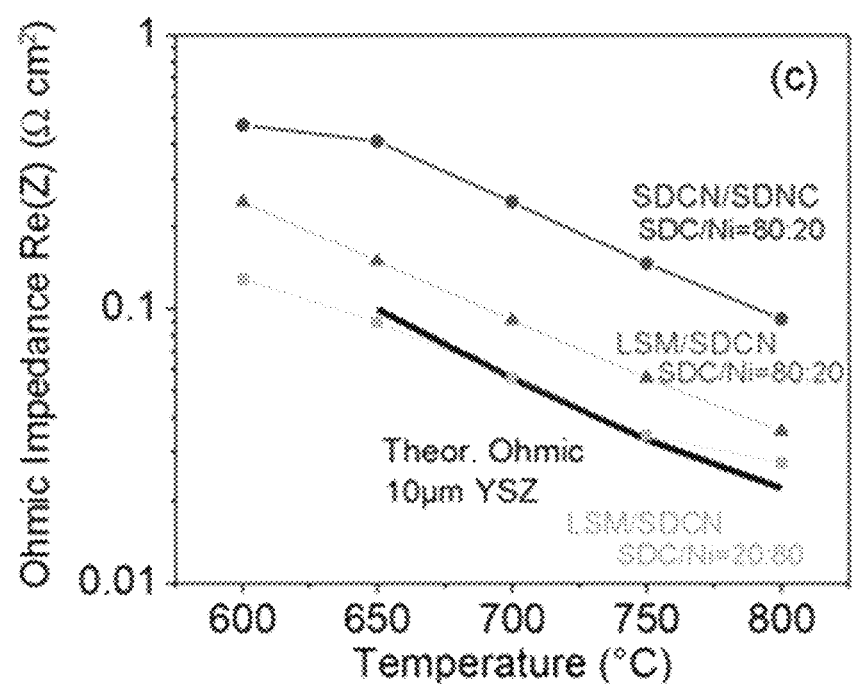
FIG. 8C shows a comparison of ohmic impedance for the improved LSM/SDCN, SDCN/SDCN, and LSM/SDCN with high Ni content (20SDC-80Ni) to the theoretical value for 10 μm YSZ electrolyte layer.

AC impedance spectra for the improved LSM/SDCN and symmetric-SDCN cells are shown in FIGS. 8A and 8B. Electrode polarization impedance dominates the total impedance, suggesting that it would be fruitful for catalyst development to achieve further performance improvement. The ohmic impedance is shown in FIG. 8C. For a cell with high Ni content in the anode (SDC/Ni [20:80 v/v]), the total cell ohmic impedance is similar to the theoretical value for the 10 μm-thick YSZ electrolyte layer, indicating excellent electronic conduction in both electrodes. In contrast, the ohmic impedance is roughly twice as high for the improved cell with only 20 vol % Ni, consistent with the lower electronic conductivity of SDC relative to Ni. The symmetric cell has significantly higher ohmic impedance, as high-conductivity LSM is replaced with SDCN; both SDC and nickel oxide have relatively low electronic conductivity in air.

In summary, symmetric-architecture metal-supported solid oxide fuel cells (MS-SOFCs) were fabricated by infiltrating both anode and cathode with catalysts. Various aspects of the infiltration process were addressed to maximize performance. Performance was found to be sensitive to precursor dilution, catalyst loading, and catalyst calcining temperature. Performance was relatively insensitive to the type of used ceria dopant and ceria-to-nickel ratio. It was found that capillary forces are sufficient to introduce some catalyst into the electrodes; however, addition of vacuum-assisted processing during infiltration greatly improves performance. A newly developed solvent-assisted infiltration technique was also used and found to be more effective than capillary forces alone but not as effective as vacuum infiltration. For a cell with a lanthanum strontium manganite (LSM) cathode and a $Sm_{0.2}Ce_{0.8}O_{2-\delta}$ mixed with Ni (SDCN) anode, peak power densities of 0.44, 1.1, and 1.9 W cm$^{-2}$ were achieved at 600, 700, and 800° C., respectively. This is about 450% higher power than was observed for the baseline cell before the infiltration process was improved and is the highest power density reported for stainless-steel-supported SOFCs to date. A fully symmetric MS-SOFC with SDCN on both the anode and cathode sides achieved peak power densities of 0.12, 0.37, and 0.76 W cm$^2$ at 600, 700, and 800° C., respectively, and is among the highest performance reported for symmetric SOFCs of any type. Demonstrating rapid thermal cycling, redox tolerance, and lifetime durability for the high-power cells developed here is the subject of ongoing work.

Further details regarding this work can be found in M. C. Tucker, "Development of High Power Density Metal-Supported Solid Oxide Fuel Cells," Energy Technol. 2017, 5, 2175, which is herein incorporated by reference.

Example 2—Experimental Details for Example 1

Green cells were assembled by laminating individual YSZ or stainless steel (P434L alloy, water atomized) layers prepared by tape casting. The layers were prepared using polymethyl methacrylate pore-former beads and water-based tape-casting binder. Individual cells were cut from a larger green sheet with a laser cutter. Cells were then subjected to debinding by firing in air in a box furnace at 525° C. for 1 h using a 0.5° C. min$^{-1}$ heat-up rate to slowly remove the binder and pore former. Cells were sintered at 1350° C. for 2 h in a tube furnace with flowing 2% hydrogen in argon.

After sintering, cells were infiltrated with $La_{0.15}Sr_{0.85}MnO_{3-\delta}$ (LSM) on the cathode side and $Sm_{0.2}Ce_{0.8}O_{2-\delta}$ (SDC) or $Y_{0.2}Ce_{0.8}O_{2-\delta}$ (YDC) mixed with Ni on the anode side (SDCN or YDCN). The ceria/Ni volume ratio was 80:20, except as noted. Precursor mixtures of metal nitrates were prepared with the intended final stoichiometric composition, with Triton-X surfactant (Sigma Aldrich, St. Louis, Mo., at surfactant loading of 0.3 g per 2 g of resulting catalyst particles) and 20-100 wt % water added to improve wetting into the cell pores. The precursor mixture was heated to ≈90° C., the cell was submerged into it, and then mild vacuum was applied to evacuate the cell pores. Areas of the cell not intended to be infiltrated were coated with acrylic paint mask. In certain cases, the vacuum was not applied and the cells were simply dipped into the hot precursor solution. Cells with "solvent-assisted" infiltration were flooded with acetone before being dipped into the precursor solution. The acetone rapidly boiled and evacuated the cell pores, promoting infiltration of the precursor throughout the porous structure. No external vacuum was applied in this case. After introducing the precursor into the cell, it was fired with a 3° C. min$^{-1}$ heating rate to 600 or 850° C. for 30 min in air to convert the precursor to the intended oxide phases. Any loose catalyst was removed from the surface of the cell by light brushing. Cells were re-infiltrated a number of times (noted in the Figure captions, for example 2× is two infiltrations) before operation and testing.

Complete cells were mounted to an alumina tube test rig using ceramic adhesive paste, with the anode side facing the inside of the tube. Each side of the cell was contacted with two platinum wires, attached with a small piece of platinum mesh spot-welded to the wire and the cell. Cells were heated at 5° C. min$^{-1}$ to the operating temperature, with ambient air outside the tube, and hydrogen bubbled through water at room temperature flowing at 120 cm$^3$ min$^{-1}$ through the inside of the tube. Open-circuit voltage (OCV), current-step I-V (current-voltage) polarization, and AC impedance (at OCV, 200 kHz to 0.1 Hz) were recorded with a multichannel potentiostat and current booster.

Example 3

Figure 10:
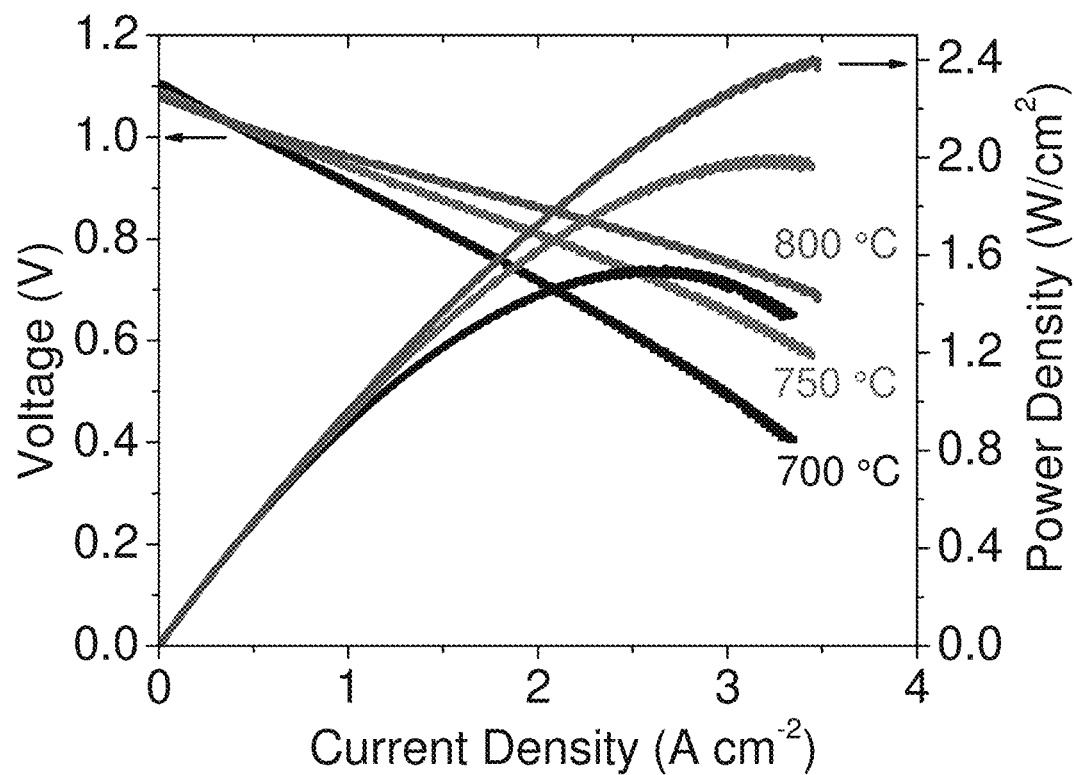
FIG. 10 shows the polarization performance for a cell infiltrated with $Pr_6O_{11}$ ($PrO_x$) on the cathode side and $Sm_{0.2}Ce_{0.8}O_{2-\delta}$ (SDC) mixed with Ni on the anode side (SDCN).

A cell was infiltrated with $Pr_6O_{11}$ (PrO$_x$) on the cathode side and $Sm_{0.2}Ce_{0.8}O_{2-\delta}$ (SDC) mixed with Ni on the anode side (SDCN). The ceria/Ni volume ratio of the final anode catalyst was 60:40. The catalyst precursors were infiltrated following the same infiltration procedure set forth in EXAMPLE 2 and fired at 3° C. min$^{-1}$ heating rate for 30 minutes to convert to catalysts, in the following order: PrO$_x$ cathode at 850° C., SDCN anode at 850° C., PrO$_x$ cathode at 600° C., SDCN anode at 600° C., Ox cathode at 600° C., SDCN anode at 600° C., SDCN anode at 600° C. The maximum obtained power density was 1.50 W/cm² at 700° C., 2.0 W/cm² at 750° C., and 2.85 W/cm² (extrapolated) at 800° C. (see FIG. 10).

Example 4

Figure 11:
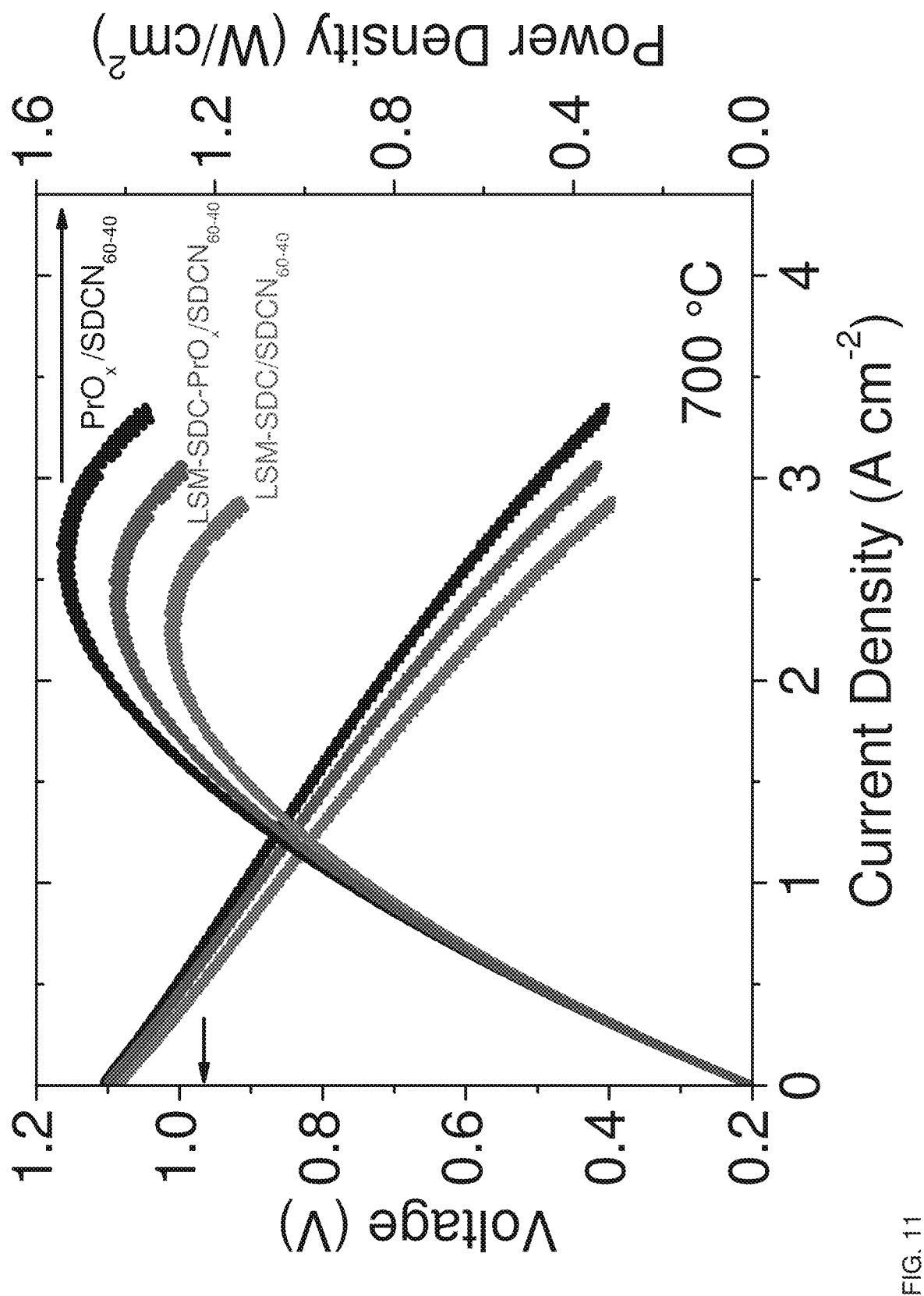
FIG. 11 shows the polarization performance for a cell infiltrated with $La_{0.15}Sr_{0.85}MnO_{3-\delta}$ (LSM)-$Sm_{0.2}Ce_{0.8}O_{2-\delta}$ (SDC) binary cathode and $Sm_{0.2}Ce_{0.8}O_{2-\delta}$ (SDC) mixed with Ni on the anode side (SDCN) and a cell infiltrated with $La_{0.15}Sr_{0.85}MnO_{3-\delta}$ (LSM)-$Sm_{0.2}Ce_{0.8}O_{2-\delta}$ (SDC)-$Pr_6O_{11}$ ($PrO_x$) ternary on the cathode side and $Sm_{0.2}Ce_{0.8}O_{2-\delta}$ (SDC) mixed with Ni on the anode side (SDCN).

A cell was infiltrated with $La_{0.15}Sr_{0.85}MnO_{3-\delta}$ (LSM)-$Sm_{0.2}Ce_{0.8}O_{2-\delta}$ (SDC) binary cathode and $Sm_{0.2}Ce_{0.8}O_{2-\delta}$ (SDC) mixed with Ni on the anode side (SDCN). The ceria/Ni volume ratio of the final anode catalyst was 60:40. The catalyst precursors were infiltrated following the same infiltration procedure set forth in EXAMPLE 2 and fired at 3° C. min⁻¹ heating rate for 30 minutes to convert to catalysts, in the following order: LSM cathode at 850° C., SDC cathode at 850° C., SDCN anode at 850° C., LSM cathode at 600° C., SDCN anode at 600° C., LSM cathode at 600° C., SDCN anode at 600° C., and SDCN anode at 600° C. The maximum obtained power density at 700° C. was 1.3 W/cm² (see FIG. 11).

Example 5

A cell was infiltrated with $La_{0.15}Sr_{0.85}MnO_{3-\delta}$ (LSM)-$Sm_{0.2}Ce_{0.8}O_{2-\delta}$ (SDC) ($PrO_x$) ternary cathode and $Sm_{0.2}Ce_{0.8}O_{2-\delta}$ (SDC) mixed with Ni on the anode side (SDCN). The ceria/Ni volume ratio of the final anode catalyst was 60:40. The catalyst precursors were infiltrated following the same infiltration procedure set forth in EXAMPLE 2 and fired at 3° C. min⁻¹ heating rate for 30 minutes to convert to catalysts, in the following order: LSM cathode at 850° C., SDC cathode at 850° C., Ox cathode at 850° C., SDCN anode at 850° C., $PrO_x$ cathode at 600° C., SDCN anode at 600° C., Ox cathode at 600° C., SDCN anode at 600° C., and SDCN anode at 600° C. The maximum obtained power density at 700° C. was 1.4 W/cm² (see FIG. 11).

Example 6—PrOx-SDC/SDCN

An electrolysis cell was infiltrated with $Pr_6O_{11}$ ($PrO_x$)-$Sm_{0.2}Ce_{0.8}O_{2-\delta}$ (SDC) composite on the air (anode) side and $Sm_{0.2}Ce_{0.8}O_{2-\delta}$ (SDC) mixed with Ni on the steam/hydrogen (cathode) side (SDCN). The ceria/Ni volume ratio of the final anode catalyst was 80:20. The catalyst precursors were infiltrated and fired at 3° C. min⁻¹ heating rate for 30 minutes to convert to catalysts, in the following order: $PrO_x$ on the anode side at 850° C., SDC on the anode side at 850° C., SDCN on the cathode side at 850° C., PrOx on the anode side at 600° C., SDC on the anode side at 600° C., SDCN on the cathode side at 600° C., PrOx on the anode side at 600° C., SDCN on the cathode side at 600° C., SDCN on the cathode side at 600° C., SDCN on the cathode side at 600° C., SDCN on the cathode side at 600° C. The best performance obtained under electrolysis mode with 50% $H_2O$-50% $H_2$ at 1.3 V was 4.9 A/cm² at 800° C., 3.2 A/cm² at 750° C., 2.0 A/cm² at 700° C., and 1.2 A/cm² at 650° C.

Example 7—LSCF-SDC/SDCN

A cell was infiltrated with $La_{0.6}Sr_{0.4}Co_{0.2}Fe_{0.8}O_{3-\delta}$ (LSCF)-$Sm_{0.2}Ce_{0.8}O_{2-\delta}$ (SDC) composite on the air (anode) side and $Sm_{0.2}Ce_{0.8}O_{2-\delta}$ (SDC) mixed with Ni on the steam/hydrogen (cathode) side (SDCN). The ceria/Ni volume ratio of the final anode catalyst was 80:20. The catalyst precursors were infiltrated and fired at 3° C. min⁻¹ heating rate for 30 minutes to convert to catalysts, in the following order: LSCF on the anode side at 850° C., SDC on the anode side at 850° C., SDCN on the cathode side at 850° C., LSCF on the anode side at 600° C., SDC on the anode side at 600° C., SDCN on the cathode side at 600° C., LSCF on the anode side at 600° C., SDCN on the cathode side at 600° C., SDCN on the cathode side at 600° C., SDCN on the cathode side at 600° C., SDCN on the cathode side at 600° C. The best performance obtained under electrolysis mode with 50% $H_2O$-50% $H_2$ at 1.3 V was 3.7 A/cm² at 800° C., 2.1 A/cm² at 750° C., 1.2 A/cm² at 700° C., and 0.5 A/cm² at 650° C.

CONCLUSION

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:

1. A method of fabricating an electrode structure, the method comprising:
   (a) providing an electrode layer comprising a ceramic, the ceramic being porous;
   (b) providing a catalyst precursor, the catalyst precursor being a cathode catalyst precursor or an anode catalyst precursor;
   (c) infiltrating the catalyst precursor in a first side of the electrode layer, wherein a second side of the electrode layer is covered by a mask that prevents infiltration of the catalyst precursor;
   (d) after operation (c), heating the electrode layer to a first temperature within a first temperature range of about 750° C. to 950° C., the catalyst precursor forming a catalyst, the catalyst being a cathode catalyst or an anode catalyst, wherein the first temperature increases interparticle contact of the catalyst, and the increased interparticle contact improves electronic and/or ionic conductivity;
   (e) after operation (d), further infiltrating the catalyst precursor in the first side of the electrode layer; and
   (f) after operation (e), heating the electrode layer to a second temperature within a second temperature range of about 300° C. to 700° C. provided that the second temperature is lower than the first temperature, the catalyst precursor forming the catalyst, the catalyst being the cathode catalyst or the anode catalyst, wherein the second temperature does not increase interparticle contact of the catalyst, and wherein any subsequent heat treatments are performed at temperatures at or below the second temperature range that do not increase interparticle contact of the catalyst and preserve a surface area of the catalyst.

2. The method of claim 1, wherein during one or more of operation (c) or operation (e) when the catalyst precursor is infiltrated in the first side of the electrode layer the catalyst precursor is heated to about 90° C. to 95° C.

3. The method of claim 1, wherein operations of infiltrating the catalyst precursor in the first side of the electrode layer are performed in a vacuum of about 600 millibar to 800 millibar.

4. The method of claim 1, further comprising:
   before operation (d), heating the electrode layer to about 40° C. to 90° C.; and before operation (f), heating the electrode layer to about 40° C. to 90° C.

5. The method of claim 1, further comprising:
after operation (f), further infiltrating the catalyst precursor in the first side of the electrode layer; and
heating the electrode layer to about 300° C. to 700° C., wherein the further infiltrating and the heating are performing until a specified amount of the catalyst is deposited on the electrode layer.

6. The method of claim 1, wherein operations (d) and (f) are performed for about 30 minutes to 5 hours.

7. The method of claim 1, wherein the ceramic comprises stabilized zirconia or doped ceria.

8. The method of claim 1, wherein the catalyst precursor comprises a metal salt.

9. The method of claim 1, wherein the catalyst precursor comprises citric acid.

10. The method of claim 1, wherein excess catalyst is removed from the electrode layer after operations (d) and (f).

11. The method of claim 1, wherein the electrode layer is about 10 microns to 250 microns thick.

12. The method of claim 1, wherein the method forms a structure comprising a catalyst layer that is about 10 microns to 100 microns thick.

13. The method of claim 1, wherein heating the electrode layer to the second temperature causes the catalyst to have at least a target surface area.

14. A method of fabricating an electrode structure, the method comprising:
(a) providing an electrode layer comprising a ceramic, the ceramic being porous;
(b) providing a cathode catalyst precursor and an anode catalyst precursor;
(c) infiltrating the cathode catalyst precursor in a first side of the electrode layer, wherein a second side of the electrode layer is covered by a mask that prevents infiltration of the cathode catalyst precursor;
(d) removing the mask and infiltrating the anode catalyst precursor in the second side of the electrode layer;
(e) after operations (c) and (d), heating the electrode layer to a first temperature within a first temperature range of about 750° C. to 950° C., the cathode catalyst precursor forming a cathode catalyst and the anode catalyst precursor forming an anode catalyst wherein the first temperature increases interparticle contact of the catalysts, and the increased interparticle contact improves electronic and/or ionic conductivity;
(f) after operation (e), further infiltrating the cathode catalyst precursor in the first side of the electrode layer;
(g) after operation (e), further infiltrating the anode catalyst precursor in the second side of the electrode layer; and
(h) after operations (f) and (g), heating the electrode layer to a second temperature within a second temperature range of about 300° C. to 700° C. provided that the second temperature is lower than the first temperature, the cathode catalyst precursor forming the cathode catalyst and the anode catalyst precursor forming the anode catalyst, wherein the second temperature does not increase interparticle contact of the catalysts, and wherein any subsequent heat treatments are performed at temperatures at or below the second temperature range that do not increase interparticle contact of the catalysts and preserve a surface area of the catalysts.

15. The method of claim 14, wherein the method forms a structure comprising a cathode catalyst layer that is about 10 microns to 100 microns thick, an anode catalyst layer that is about 10 microns to 100 microns thick, and an electrolyte layer that is about 5 microns to 50 microns thick disposed between the cathode catalyst layer and the anode catalyst layer.

16. The method of claim 15, wherein the cathode catalyst layer and the anode catalyst layer are the same thickness.

17. The method of claim 14, wherein the cathode catalyst precursor and the anode catalyst precursor are the same composition.

18. The method of claim 14, wherein the electrode layer is about 10 microns to 250 microns thick.

19. The method of claim 14, wherein the cathode catalyst precursor comprises a first metal salt, and wherein the anode catalyst precursor comprises a second metal salt.

20. The method of claim 14, further comprising:
after operation (f), further infiltrating the cathode catalyst precursor in the first side of the electrode layer; and
heating the electrode layer to about 300° C. to 700° C., wherein the infiltrating and the heating are performing until a specified amount of the cathode catalyst is deposited on the electrode layer.

21. The method of claim 14, further comprising:
after operation (g), further infiltrating the anode catalyst precursor in the second side of the electrode layer; and
heating the electrode layer to about 300° C. to 700° C., wherein the infiltrating and the heating are performing until a specified amount of the anode catalyst is deposited on the electrode layer.

* * * * *